(12) United States Patent
Furukawa

(10) Patent No.: US 11,024,442 B2
(45) Date of Patent: Jun. 1, 2021

(54) COMPOSITION FOR ELECTRIC WIRE COATING MATERIAL AND INSULATED ELECTRIC WIRE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Toyoki Furukawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC TECHNOLOGIES, LTD., Osaka (JP)

( * ) Notice: Subject to any disclaimer, the term of this patent is extended or adjusted under 35 U.S.C. 154(b) by 103 days.

(21) Appl. No.: 16/461,426

(22) PCT Filed: Nov. 16, 2017

(86) PCT No.: PCT/JP2017/041216
§ 371 (c)(1),
(2) Date: May 16, 2019

(87) PCT Pub. No.: WO2018/101056
PCT Pub. Date: Jun. 7, 2018

(65) Prior Publication Data
US 2019/0348192 A1    Nov. 14, 2019

(30) Foreign Application Priority Data

Nov. 30, 2016 (JP) ............................. JP2016-232238

(51) Int. Cl.
*H01B 3/04*     (2006.01)
*H01B 3/44*     (2006.01)
*C09D 127/06*   (2006.01)
*H01B 3/42*     (2006.01)
*H01B 7/29*     (2006.01)

(52) U.S. Cl.
CPC ............ *H01B 3/443* (2013.01); *C09D 127/06* (2013.01); *H01B 3/421* (2013.01); *H01B 7/292* (2013.01)

(58) Field of Classification Search
CPC .......... H01B 3/02; H01B 3/443; H01B 3/421; H01B 7/02; H01B 7/04; H01B 7/292
USPC ............... 174/110 R–110 PM, 120 R, 121 R, 174/120 SR, 121 SR
See application file for complete search history.

(56) References Cited

U.S. PATENT DOCUMENTS 5,672,650 A * 9/1997 Yagi ....................... C08L 27/06
                                                  524/513
2018/0346700 A1  12/2018 Liu et al.

FOREIGN PATENT DOCUMENTS

| JP | 03-115451 A | * 5/1991 | ............... C08K 5/04 |
| JP | 04-011647 A | 1/1992 | |

(Continued)

OTHER PUBLICATIONS

International Search Report dated Dec. 19, 2017 for WO 2018/101056 A1.

*Primary Examiner* — William H. Mayo, III
(74) *Attorney, Agent, or Firm* — Abelman, Frayne & Schwab

(57) ABSTRACT

A composition for an electric wire coating material containing polyvinyl chloride includes a plasticizer in an amount of 40 to 80 parts by mass with respect to 100 parts by mass of the polyvinyl chloride, and a polyester elastomer.

9 Claims, 1 Drawing Sheet

(56) References Cited

FOREIGN PATENT DOCUMENTS

| | | | |
|---|---|---|---|
| JP | 06-223630 A | 8/1994 | |
| JP | 06-256567 A | 9/1994 | |
| JP | 08-143734 A | 6/1996 | |
| JP | 2000-294039 A | 10/2000 | |
| JP | 2013-133376 A | 7/2013 | |
| JP | 2015-025032 A | 2/2015 | |
| JP | 2015-130242 A | 7/2015 | |
| JP | 2016-183289 A * | 10/2016 | ............... H01B 3/44 |
| JP | 2016-183289 A | 10/2016 | |

* cited by examiner

COMPOSITION FOR ELECTRIC WIRE COATING MATERIAL AND INSULATED ELECTRIC WIRE

CROSS REFERENCE TO RELATED APPLICATIONS

This application is a national phase of PCT application No. PCT/JP2017/041216, filed on 16 Nov. 2017, which claims priority from Japanese patent application No. 2016-232238, filed on 30 Nov. 2016, all of which are incorporated herein by reference.

TECHNICAL FIELD

The present invention relates to a composition for an electric wire coating material and an insulated electric wire, and specifically to a composition for an electric wire coating material that is suitable as a coating material for an electric wire routed in a vehicle such as an automobile, and an insulated electric wire in which this composition is used.

BACKGROUND

Conventionally, an insulated electric wire having a conductor and an insulator that coats an outer periphery of the conductor has been used in electric and electronic devices such as automobiles. In general, a polyvinyl chloride composition obtained by blending a plasticizer is often used as the material of an insulator. However, if a polyvinyl chloride composition is used in a place having a high temperature, such as a wire harness of an automobile, there has been a problem in that electric wires easily undergo fusion and easily deform, for example.

Conventional insulated electric wires such as that described above having an insulator obtained by blending a plasticizer into polyvinyl chloride usually have a relatively small diameter. In recent years, insulated electric wires with a relatively large diameter, such as power cables, have been required. However, if a conventional insulator is applied to an insulated electric wire with a large diameter, its flexibility needs to be increased, because a conventional insulator has insufficient flexibility.

In order to increase the flexibility of a conventional insulator, it is conceivable to use the method of increasing the amount of a plasticizer to be blended. However, there is a risk that an increase in the amount of a plasticizer will reduce heat resistance such as fusibility resistance and heat deformability resistance.

To address this, it is known that fusibility resistance and heat deformability resistance can be improved using a method for crosslinking a coating material by irradiating the coating material with an electron beam or the like (Patent Document 1), a method using polyvinyl chloride with a high degree of polymerization (Patent Document 2), or a method for blending an inorganic filler (Patent Document 3), for example.

PRIOR ART DOCUMENT

Patent Document

Patent Document 1: JP 2000-294039A
Patent Document 2: JP 2015-025032A
Patent Document 3: JP H06-256567A

SUMMARY OF THE INVENTION

Problems to be Solved

However, there has been a problem in that electron beam crosslinking requires an expensive electron beam crosslinking apparatus, for example, and equipment cost is high, and thus manufacturing cost increases. On the other hand, there has been a problem in that with a method using polyvinyl chloride with a high degree of polymerization and a method using an inorganic filler, their manufacturability decreases due to an increase in the viscosity of a resin composition and defects easily appear in the appearance of an insulated electric wire.

An object of the present invention is to provide a composition for an electric wire coating material that does not require an expensive electron beam crosslinking apparatus, for example, and has excellent fusibility resistance, heat deformability resistance, and flexibility, and also provide an insulated electric wire in which this composition is used.

Means to Solve the Problem

In order to resolve the above-described issue, a composition for an electric wire coating material according to the present invention contains polyvinyl chloride, and a plasticizer in an amount of 40 to 80 parts by mass with respect to 100 parts by mass of the vinyl chloride, and a polyester elastomer.

It is preferable that the composition contains the polyester elastomer in an amount of 10 to 80 parts by mass with respect to 100 parts by mass of the polyvinyl chloride.

It is preferable that the polyester elastomer has a melting point of at least 190° C.

It is preferable that the polyester elastomer has a tensile modulus of not more than 300 MPa.

It is preferable that the plasticizer is one or more selected from trimellitic acid esters, pyromellitic acid esters, and polyester-based plasticizers.

Also, in an insulated electric wire according to the present invention, the compositions for an electric wire coating material according to any of the above-described aspects is used in an electric wire coating material.

Effect of the Invention

According to the present invention, the composition for an electric wire coating material contains polyvinyl chloride, a plasticizer in an amount of 40 to 80 parts by mass with respect to 100 parts by mass of the polyvinyl chloride, and a polyester elastomer, and thus it is possible to provide a composition for an electric wire coating material that has excellent fusibility resistance, heat deformability resistance, and flexibility, and an insulated electric wire in which this composition is used.

In general, a method of crosslinking polyvinyl chloride using an electron beam, a silane compound, or peroxide, for example, is used as a method for increasing the fusibility resistance and heat deformability resistance of a polyvinyl chloride composition. According to the present invention having the above-described aspects, it is possible to increase fusibility resistance and heat deformability resistance without crosslinking.

Also, although an inorganic filler is added in order to increase the fusibility resistance and heat deformability resistance of a polyvinyl chloride composition, there has been a problem in that the manufacturability decreases due to an increase in the viscosity of the resin composition, flexibility decreases, and defects easily appear in the appearance of an insulated electric wire in this case, for example. According to the present invention, it is possible to increase fusibility resistance and heat deformability resistance without adding an inorganic filler, or, if an inorganic filler is added, by adding the inorganic filler in a small amount such as not more than 30 parts by mass with respect to 100 parts by mass of polyvinyl chloride.

DETAILED DESCRIPTION TO EXECUTE THE INVENTION

Figure 1A:
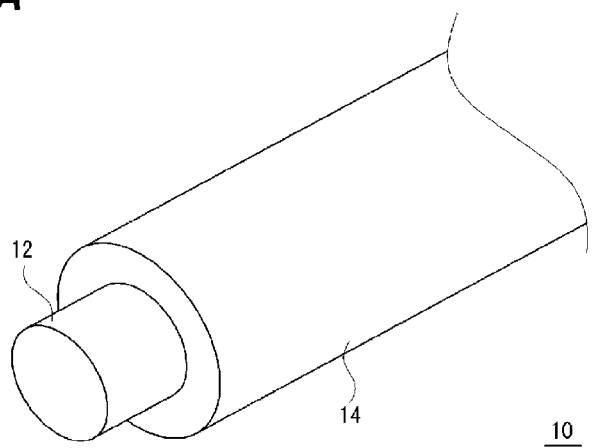
FIGS. 1A and 1B are diagrams of an insulated electric wire according to a first embodiment of the present invention, FIG. 1A showing its perspective view and FIG. 1B showing its cross-sectional view in its circumferential direction.

Next, an embodiment of the present invention will be described in detail.

A composition for an electric wire coating material according to the present invention contains polyvinyl chloride, a plasticizer in an amount of 40 to 80 parts by mass with respect to 100 parts by mass of the polyvinyl chloride, and a polyester elastomer.

Although there is no particular limitation on polyvinyl chloride that serves as a base resin, from the viewpoint of obtaining excellent heat deformability resistance, the degree of polymerization is preferably at least 1200. Also, from the viewpoint of suppressing a decrease in miscibility with other components, the degree of polymerization is preferably not more than 2800. More preferably, the degree of polymerization is in a range of 1700 to 2500.

The composition contains the plasticizer in an amount of 40 to 80 parts by mass with respect to 100 parts by mass of polyvinyl chloride. If the content of the plasticizer is less than 40 parts by mass, flexibility is not satisfactory. On the other hand, if the content of the plasticizer exceeds 80 parts by mass, heat deformability resistance is not satisfactory. The content of the plasticizer is more preferably in a range of 50 to 60 parts by mass with respect to 100 parts by mass of polyvinyl chloride.

Examples of the plasticizer include phthalic acid esters, trimellitic acid esters, pyromellitic acid esters, fatty acid esters, polyester-based plasticizers, and oils. An example of oil is an epoxidized soybean oil. These may be used alone or in combination as the plasticizer. From the viewpoint of obtaining excellent fusibility resistance, one or more selected from trimellitic acid esters, pyromellitic acid esters, and polyester-based plasticizers out of these compounds are preferable.

Examples of alcohol that constitutes trimellitic acid esters and pyromellitic acid esters include saturated fatty alcohols each having 8 to 13 carbon atoms. One or more of these alcohols may be used.

A polyester elastomer is constituted by a block copolymer including a hard segment and a soft segment. Examples of the hard segment include crystalline polyesters such as PBT and PBN. Examples of the soft segment include aliphatic polyethers and aliphatic polyesters.

The composition preferably contains the polyester elastomer in an amount of 10 to 80 parts by mass with respect to 100 parts by mass of polyvinyl chloride. More preferably, the content of the polyester elastomer is in a range of 40 to 80 parts by mass. If the content of the polyester elastomer is at least 10 parts by mass, the polyester elastomer has a great effect on improvement in fusibility resistance and heat deformability resistance, and if the content of the polyester elastomer is at least 40 parts by mass, the polyester elastomer particularly has a significant effect on improvement in fusibility resistance and heat deformability resistance. On the other hand, if the content of the polyester elastomer exceeds 80 parts by mass, there is a risk that resistance against battery liquid will decrease.

From the viewpoint of manufacturability, it is preferable that the polyester elastomer has a low melting point. This is because, if the melting point is too high, the temperature needs to be increased when the polyester elastomer is kneaded with polyvinyl chloride. On the other hand, from the viewpoint of fusibility resistance and heat deformability resistance, it is preferable that the polyester elastomer has a high melting point.

Taking this into consideration, the polyester elastomer preferably has a melting point of at least 190° C. Its melting point is more preferably at least 200° C., and even more preferably at least 210° C. If the melting point is at least 190° C., the polyester elastomer has a great effect on improvement in fusibility resistance and heat deformability resistance. On the other hand, the upper limit of the melting point is preferably not more than 220° C. If the melting point is not more than 220° C., good manufacturability can be achieved and the polyester elastomer tends to have a low elastic modulus, and thus the composition has excellent flexibility, in particular.

The polyester elastomer preferably has a tensile modulus of not more than 300 MPa. If the tensile modulus is not more than 300 MPa, excellent flexibility can be obtained. On the other hand, the lower limit of the tensile modulus is preferably at least 50 MPa. If the tensile modulus is at least 50 MPa, the polyester elastomer tends to have a high melting point, and particularly has a significant effect on improvement in fusibility resistance and heat deformability resistance.

It is preferable that the composition for an electric wire coating material according to the present invention does not contain an inorganic filler. If the composition contains an inorganic filler, the compositions preferably contains the inorganic filler in an amount of not more than 30 parts by mass with respect to 100 parts by mass of polyvinyl chloride. If the content of the inorganic filler is not more than 30 parts by mass, excellent manufacturability and flexibility can be obtained.

Examples of the inorganic filler include metal oxides such as silica, diatomaceous earth, a glass ball, talc, clay, alumina, magnesium oxide, zinc oxide, antimony trioxide, and molybdenum oxide, metal carbonates such as calcium carbonate and magnesium carbonate, metal borates such as zinc borate and barium metaborate, and hydrotalcites. These may be used alone or in combination.

The composition for an electric wire coating material according to the present invention may also contain components other than polyvinyl chloride, the plasticizer, and the polyester elastomer within a range not impairing the object of the present invention. Examples of other components include additives that are usually used in an electric wire coating material, such as stabilizers, pigments, antioxidants, and expanders. Although the composition may also contain other polymers within a range not impairing the object of the present invention as other components, it is preferable that the composition contains only polyvinyl chloride, a plasticizer, and a polyester elastomer as polymer components.

The composition for an electric wire coating material according to the present invention can be prepared by blending the plasticizer, the polyester elastomer, and various additive components that are added as needed, into polyvinyl chloride that serves as a base resin, and kneading while heating the mixture, for example. At this time, a general kneader such as a banbury mixer, a pressure kneader, a kneading extruder, a twin screw extruder, or a roll kneader may be used. Before the mixture is kneaded and heated, the components may be dry-blended in advance using a tumbler, for example. After the mixture is kneaded and heated, a composition is retrieved from the kneader. At this time, the composition may be molded into pellets using a pelletizer.

Next, an insulated electric wire according to the present invention will be described.

Figure 1B:
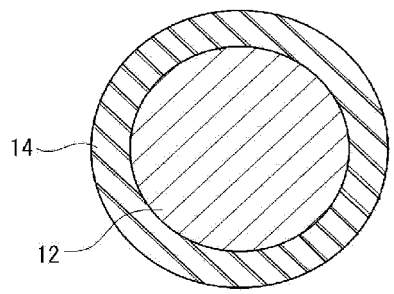

FIG. 1A shows a perspective view of an insulated electric wire according to one embodiment of the present invention and FIG. 1B shows a cross-sectional view (cross-sectional view in its circumferential direction). As shown in FIGS. 1A and 1B, an insulated electric wire 10 includes a conductor 12 and an insulating coating layer (electric wire coating material) 14 that coats the outer periphery of the conductor 12. The insulating coating layer 14 is formed using the composition for an electric wire coating material according to the present invention. The insulated electric wire 10 can be obtained by subjecting the outer circumference of the conductor 12 to extrusion coating with the composition for an electric wire coating material according to the present invention.

Although copper is ordinarily used as the conductor 12, metal materials such as aluminum and magnesium may also be used instead of copper. The metal material may also be an alloy. Examples of other metal materials for obtaining an alloy include iron, nickel, magnesium, silicon, and combinations thereof. The conductor 12 may be constituted by a single wire or a twisted wire obtained by twisting a plurality of wires.

According to the composition for an electric wire coating material and the insulated electric wire having the above-described configurations, the composition and the insulated electric wire have excellent fusibility resistance, heat deformability resistance, and flexibility. Because the composition contains a polyester elastomer, its fusibility resistance and heat deformability resistance are improved, and thus the content of the plasticizer can be increased.

The insulated electric wire according to the present invention has excellent fusibility resistance, heat deformability resistance, and flexibility, and thus is suitable as a thick electric wire. Examples of the thick electric wire include electric wires having an electric wire outer diameter of ø2.3 to 14.9 mm, and having a conductor cross-sectional area of 3 to 100 mm². In this case, the insulating coating layer has a standard thickness of 0.7 to 2.00 mm.

Also, the insulated electric wire according to the present invention can be utilized in various electric wires for automobiles, devices, information communication, power, ships, and aircrafts, for example. In particular, the insulated electric wire can be suitably utilized as an electric wire for an automobile.

Although the embodiments of the present invention have been described in detail above, the present invention is not limited to any of the above-described embodiments, and it will be appreciated that various modifications can be made without departing from the gist of the present invention.

For example, the insulated electric wire may be formed into forms such as flat wires and shielded wires other than the single wire shown in FIGS. 1A and 1B. Also, the insulating layer may be constituted by two or more layers.

WORKING EXAMPLES

Hereinafter, working examples of the present invention will be described in detail, but the present invention is not limited to the working examples.

Working Examples 1 to 13

(Preparation of Composition for Electric Wire Coating Material)

Compositions for an electric wire coating material containing polyvinyl chloride were prepared by kneading polyvinyl chloride, a plasticizer, a polyester elastomer, and a lead-free heat stabilizer using a twin screw extruder at 220° C. with the blending compositions (parts by mass) shown in Tables 1 and 2, and molding the resulting mixture into pellets using a pelletizer.

Production of Insulated Electric Wire

An insulated electric wire (having an electric wire outer diameter of 8.7 mm) was produced by extrusion molding the prepared composition for an electric wire coating material around a twisted wire conductor having a cross-sectional area of 20 mm² at a coating thickness of 1.1 mm.

Comparative Examples 1 to 3

Compositions for an electric wire coating material were prepared and insulated electric wires were produced similarly to working examples, except that components were mixed with the blending compositions (parts by mass) shown in Table 2.

(Materials Used)

Polyvinyl Chloride

Degree of polymerization 1300: "ZEST1300Z" manufactured by Shin Daiichi Vinyl Corp.

Degree of polymerization 2500: "ZEST2500Z" manufactured by Shin Daiichi Vinyl Corp.

Plasticizer

Phthalic acid ester: "DUP" manufactured by J-PLUS Co., Ltd.

Trimellitic acid ester: "Monocizer W-750" manufactured by DIC Corporation

Pyromellitic acid ester: "Monocizer W-7010" manufactured by DIC Corporation

Polyester-based plasticizer: "Polycizer W-2310" manufactured by DIC Corporation

Polyester Elastomer

High melting point and low elastic modulus: "Hytrel 4777" (melting point is 200° C., tensile modulus is 56.9 MPa) manufactured by DU PONT-TORAY CO., LTD.

Low melting point and low elastic modulus: "Hytrel 4047N" (melting point is 182° C., tensile modulus is 49.5 MPa) manufactured by DU PONT-TORAY CO., LTD.

High melting point and high elastic modulus: "Hytrel 7247" (melting point is 216° C., tensile modulus is 422 MPa) manufactured by DU PONT-TORAY CO., LTD.

Lead-free heat stabilizer: product name "RUP-110" manufactured by ADEKA (Evaluation)

The fusibility resistance, heat deformability resistance, flexibility, and resistance against battery liquid of the produced insulated electric wires were evaluated based on the following evaluation methods.

(Fusibility Resistance)

Two insulated electric wires that were cut to a length of 100 mm were bundled and fixed together using a fluorine tape, and left in an atmosphere having a temperature of 150° C. and in an atmosphere having a temperature of 180° C. for 1 hour. Then, the tape was removed, and the insulated electric wires were observed to check whether two insulated electric wires were fused. If two insulated electric wires were not fused in an atmosphere having a temperature of 150° C., they were evaluated as acceptable "O", if two insulated electric wires were not fused also in an atmosphere having a temperature of 180° C., they were evaluated as excellent "+", and if two insulated electric wires were fused in an atmosphere having a temperature of 150° C., they were evaluated as not acceptable "−".

(Heat Deformability Resistance)

Tests were performed under conditions where the ambient temperature was 150° C. and an additional load was 345 g in conformity with the test method in JIS C 3005, a decrease ratio was calculated using the thickness of an insulating layer prior to heating and the thickness of a portion of the insulating layer that deformed after heating, and the calculated value was regarded as a deformation ratio. A case where the deformation ratio was less than 40% was evaluated as acceptable "O", a case where the deformation ratio was less than 30% was evaluated as excellent "+", and a case where the deformation ratio is at least 40% was evaluated as not acceptable "−".

(Flexibility)

Tensile testing was performed using only an insulating layer obtained by removing a conductor from an insulated electric wire. A test was performed under conditions where the distance between the chucks was 20 mm and the tensile speed was 50 mm/min, and a tensile modulus was calculated using a change obtained by applying a test force of 1 N to 2 N thereto. A case where the tensile modulus was not more than 200 MPa was evaluated as acceptable "O", a case where the tensile modulus was not more than 100 MPa was evaluated as excellent "+", and a case where the tensile modulus exceeded 200 MPa was evaluated as not acceptable "−".

(Resistance Against Battery Liquid)

In conformity with ISO6722, an aqueous solution of sulfuric acid with a density of 1.26 was dropped on insulating layers of insulated electric wires, the resulting insulated electric wires were introduced into a thermostat bath having a temperature of 80° C. and a thermostat bath having a temperature of 100° C., the aqueous solution of sulfuric acid was dropped thereon after 8 hours, 16 hours, and 32 hours again, and the resulting insulated electric wires were respectively introduced into the thermostat baths, and those procedures were repeated, and the resulting insulated electric wires were removed after 48 hours. Then, the obtained insulated electric wires were immersed in 3% salt water for 10 minutes, and a voltage tolerance test was performed at 1 kV for 1 minute. A case where an insulated electric wire did not undergo insulation breakdown in an evaluation made in an atmosphere having a temperature of 80° C. was evaluated as acceptable "O", a case where an insulated electric wire did not undergo insulation breakdown in an evaluation made in an atmosphere having a temperature of 100° C. was evaluated as excellent "+", and a case where an insulated electric wire underwent insulation breakdown in an evaluation made in an atmosphere having a temperature of 80° C. was evaluated as not acceptable "−".

TABLE 1

| | | Working Examples | | | | | | | |
|---|---|---|---|---|---|---|---|---|---|
| | | 1 | 2 | 3 | 4 | 5 | 6 | 7 | 8 |
| Polyvinyl chloride | degree of polymerization 1300 | | | | | | | | |
| | degree of polymerization 2500 | 100 | 100 | 100 | 100 | 100 | 100 | 100 | 100 |
| Plasticizer | phthalic acid ester | | | | | | | | 50 |
| | trimellitic acid ester | 50 | 50 | 50 | 50 | 50 | 50 | 50 | |
| | pyromellitic acid ester | | | | | | | | |
| | polyester-based plasticizer | | | | | | | | |
| Polyester elastomer | High melting point and low elastic modulus | 40 | | | 5 | 10 | 80 | 90 | 40 |
| | Low melting point and low elastic modulus | | 40 | | | | | | |
| | High melting point and high elastic modulus | | | 40 | | | | | |
| | Lead-free heat stabilizer | 5 | 5 | 5 | 5 | 5 | 5 | 5 | 5 |
| Evaluation result | Fusibility resistance | + | O | + | O | + | + | + | O |
| | Heat deformability resistance | + | O | + | O | + | + | + | + |
| | Flexibility | + | + | O | + | + | + | + | + |
| | Resistance against battery liquid | + | + | + | + | + | + | O | + |

* "+" = excellent,
"O" = acceptable

TABLE 2

| | | Working Examples | | | | | Comparative Examples | | |
|---|---|---|---|---|---|---|---|---|---|
| | | 9 | 10 | 11 | 12 | 13 | 1 | 2 | 3 |
| Polyvinyl chloride | degree of polymerization 1300 | | | | | 100 | | | |
| | degree of polymerization 2500 | 100 | 100 | 100 | 100 | | 100 | 100 | 100 |
| Plasticizer | phthalic acid ester | | | | | | | | |
| | trimellitic acid ester | | | 40 | 80 | 50 | 50 | 30 | 90 |
| | pyromellitic acid ester | 50 | | | | | | | |
| | polyester-based plasticizer | | 50 | | | | | | |
| Polyester elastomer | High melting point and low elastic modulus | 40 | 40 | 40 | 40 | 40 | | 40 | 40 |
| | Low melting point and low elastic modulus | | | | | | | | |
| | High melting point and high elastic modulus | | | | | | | | |
| | Lead-free heat stabilizer | 5 | 5 | 5 | 5 | 5 | 5 | 5 | 5 |
| Evaluation result | Fusibility resistance | + | + | + | + | + | − | + | + |
| | Heat deformability resistance | + | + | + | + | ○ | − | + | − |
| | Flexibility | + | + | + | + | + | + | − | + |
| | Resistance against battery liquid | + | + | + | + | + | + | + | + |

\* "+" = excellent,
"○" = acceptable,
"−" = not acceptable

Comparative Example 1 did not contain a polyester elastomer, and thus its fusibility resistance and heat deformability resistance were not satisfactory. Also, Comparative Example 2 contained a small amount of a plasticizer, and thus its flexibility was not satisfactory. On the other hand, Comparative Example 3 contained a large amount of a plasticizer, and thus its heat deformability resistance was not satisfactory.

In contrast, the working examples satisfying the configurations of the present invention had excellent fusibility resistance, heat deformability resistance, flexibility, and resistance against battery liquid. According to Working Examples 1 to 3, the higher the melting point of the polyester elastomer is, the higher the fusibility resistance and the heat deformability resistance are, and the lower the elastic modulus of the polyester elastomer is, the higher the flexibility is. Also, according to Working Examples 1, and 4 to 7, if the content of the polyester elastomer is low, its effect on fusibility resistance and heat deformability resistance decreases, and if the content of the polyester elastomer is high, the resistance against battery liquid decreases. According to Working Examples 1, and 8 to 10, from the viewpoint of fusibility resistance, in particular, trimellitic acid esters, pyromellitic acid esters, and polyester-based plasticizers are excellent as plasticizers.

LIST OF REFERENCE NUMERALS

10 Insulated electric wire
12 Conductor
14 Insulating coating layer

The invention claimed is:

1. A composition for an electric wire coating material containing polyvinyl chloride,
    wherein the composition contains a plasticizer in an amount of 40 to 80 parts by mass with respect to 100 parts by mass of the polyvinyl chloride, and a polyester elastomer,
    the polyester elastomer has a melting point of at least 190° C., and
    the polyester elastomer has a tensile modulus of 50 to 300 MPa.

2. The composition for an electric wire coating material according to claim 1,
    wherein the plasticizer is one or more selected from pyromellitic acid esters.

3. The composition for an electric wire coating material according to claim 1,
    wherein the composition contains the polyester elastomer in an amount of 10 to 80 parts by mass with respect to 100 parts by mass of the polyvinyl chloride.

4. An insulated electric wire in which the composition for an electric wire coating material according to claim 1 is used in an electric wire coating material.

5. The composition for an electric wire coating material according to claim 1, wherein the composition does not contain an inorganic filler.

6. The composition for an electric wire coating material according to claim 1, wherein the composition contains an inorganic filler in an amount of not more than 30 parts by mass with respect to 100 parts by mass of the polyvinyl chloride.

7. A composition for an electric wire coating material containing polyvinyl chloride,
    wherein the composition contains a plasticizer in an amount of 40 to 80 parts by mass with respect to 100 parts by mass of the polyvinyl chloride, and a polyester elastomer,
    the plasticizer is one or more selected from trimellitic acid esters and pyromellitic acid esters, and
    alcohols that constitute the trimellitic acid esters or the pyromellitic acid esters are saturated fatty alcohols each having 8 to 13 carbon atoms.

8. The composition for an electric wire coating material according to claim 7, wherein the polyester elastomer has a melting point of at least 190° C.

9. The composition for an electric wire coating material according to claim 7,
wherein the polyester elastomer has a tensile modulus of not more than 300 MPa.

\* \* \* \* \*